United States Patent
Doree et al.

(10) Patent No.: US 11,277,451 B2
(45) Date of Patent: Mar. 15, 2022

(54) METHOD AND ENTITY FOR MANAGING A MULTIMEDIA SESSION BETWEEN A CALLING TERMINAL AND AT LEAST ONE CALLED TERMINAL, CORRESPONDING TERMINAL AND COMPUTER PROGRAMS

(71) Applicant: Orange, Paris (FR)

(72) Inventors: José Doree, Châtillon (FR); Jean-Claude Le Rouzic, Châtillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/759,284

(22) PCT Filed: Oct. 16, 2018

(86) PCT No.: PCT/FR2018/052573
§ 371 (c)(1),
(2) Date: Apr. 24, 2020

(87) PCT Pub. No.: WO2019/081836
PCT Pub. Date: May 2, 2019

(65) Prior Publication Data
US 2021/0185096 A1 Jun. 17, 2021

(30) Foreign Application Priority Data
Oct. 27, 2017 (FR) ..................................... 1760201

(51) Int. Cl.
*H04L 29/06* (2006.01)
*H04L 65/1069* (2022.01)
(Continued)

(52) U.S. Cl.
CPC ...... *H04L 65/1069* (2013.01); *H04L 65/1006* (2013.01); *H04L 65/1016* (2013.01); *H04L 65/80* (2013.01)

(58) Field of Classification Search
CPC ................. H04L 65/10–65/1016; H04L 65/80
See application file for complete search history.

(56) References Cited

U.S. PATENT DOCUMENTS

2007/0291776 A1* 12/2007 Kenrick ............... H04L 65/608
370/401
2008/0146208 A1* 6/2008 Ejzak .................. H04L 65/1043
455/416
(Continued)

FOREIGN PATENT DOCUMENTS

WO  WO 2012/042150 A1  4/2012

OTHER PUBLICATIONS

International Search Report and Written Opinion dated Dec. 21, 2018 for Application No. PCT/FR2018/052573.
(Continued)

*Primary Examiner* — Clayton R Williams
(74) *Attorney, Agent, or Firm* — Knobbe, Martens, Olson & Bear, LLP

(57) ABSTRACT

The disclosed technology relates to a method for managing a multimedia session between a calling terminal and at least one called terminal. In one aspect, the multimedia session comprises a pre-call setup phase and a call phase. According to the disclosed technology, the method comprises, during the pre-call setup phase, a reception of an INVITE message generated by a calling terminal. The INVITE message comprises a description field describing the multimedia session and containing information relating to a set of media streams. A response is generated to the INVITE message, wherein the response comprises a header containing at least one media type and at least one first call parameter applicable to at least one media stream of the media type, among the set of media streams.

11 Claims, 4 Drawing Sheets

(51) Int. Cl.
*H04L 65/10* (2022.01)
*H04L 65/1016* (2022.01)
*H04L 65/80* (2022.01)

(56) References Cited

U.S. PATENT DOCUMENTS

| | | | | |
|---|---|---|---|---|
| 2009/0262915 A1* | 10/2009 | Wu | ......................... | H04M 3/02 |
| | | | | 379/207.16 |
| 2009/0290573 A1* | 11/2009 | Belling | ............... | H04L 65/1043 |
| | | | | 370/352 |
| 2011/0040883 A1* | 2/2011 | Belling | ............... | H04L 65/1096 |
| | | | | 709/228 |
| 2013/0246632 A1* | 9/2013 | Ginde | ..................... | H04L 29/06 |
| | | | | 709/227 |
| 2021/0136231 A1* | 5/2021 | Antunes | ................ | H04L 65/608 |

OTHER PUBLICATIONS

Richard Ejzak, "Private Header (P-Header) Extension to the Session Initiation Protocol (SIP) for Authorization of Early Media", Request for Comments document (RFC 5009)—Internet Publication, dated Sep. 2007, 15 pgs., Network Working Group via the Internet Engineering Task Force's RFP archive, Naperville IL USA.

* cited by examiner

METHOD AND ENTITY FOR MANAGING A MULTIMEDIA SESSION BETWEEN A CALLING TERMINAL AND AT LEAST ONE CALLED TERMINAL, CORRESPONDING TERMINAL AND COMPUTER PROGRAMS

RELATED APPLICATIONS

This application is the U.S. National Phase of Application No. PCT/FR2018/052573 entitled "METHOD AND ENTITY FOR MANAGING A MULTIMEDIA SESSION BETWEEN A CALLING TERMINAL AND AT LEAST ONE CALLED TERMINAL, CORRESPONDING TERMINAL AND COMPUTER PROGRAMS" and filed Oct. 16, 2018, which claims the benefit of French Patent Application No. 1760201, filed Oct. 27, 2017, each of which is incorporated by reference in its entirety.

FIELD OF THE INVENTION

The field of the invention is that of multimedia communications within a network.

More specifically, the invention offers a solution for managing a multimedia session, and in particular the selection, during a pre-call setup phase, of the media streams authorised during this phase. "Media stream" is, in particular, understood to mean a stream associated with a media type, such as an audio stream, a video stream, a stream carrying application data, a stream carrying text data, a stream carrying image data, etc.

The media streams exchanged during the pre-call setup phase, for example received by a caller before the called party answers, are called "early media" streams. The invention applies in particular to the delivery of such "early media" streams.

The invention has in particular, but not exclusively, applications in IMS (IP Multimedia Subsystem) networks using the SIP (Session Initiation Protocol) signalling protocol to manage the multimedia sessions.

In IMS networks the pre-call setup phase, during which the "early media" streams are delivered, traditionally designates the phase between a SIP INVITE message sent by the calling terminal and a final SIP response, for example a 200 OK positive response.

PRIOR ART

Certain services, in particular telephone services, require one or more media streams to be sent before call setup. Examples of this are Music on Hold (MOH), announcements indicating the cost of the service consulted (for example for a weather forecast, the speaking clock, or the Paris Airports).

This type of service sometimes requires interaction with the calling user, for example to end the film being shown or to direct the calling user to a specific correspondent.

Today, in SIP signalling, there is a header called "P-Early-Media" (PEM) allowing the network to control the delivery of a given type of media streams and to indicate, in the call progress messages, whether the media streams must be "open", i.e. authorised or not, prior to call setup. Such a PEM header is, in particular, defined in document RFC 5009.

Unfortunately, such a header is not always sufficient to define the media streams which are authorised or not, before call setup. Indeed, it applies to all media streams, or all media streams of a given type, described in a multimedia session description field, for example an SDP (Session Description Protocol) field, which can be insufficient.

For example, we consider a multimedia video telephony session (i.e. audio and video communication), during which a user can communicate with an interactive voice server during the pre-call setup phase (for example the ring phase). According to this example, such a voice server authorises audio streams to be sent and received which are encoded only using an AMR (Adaptive Multi-Rate) audio codec. Since the PEM header applies to all the media streams of a given type, the calling terminal can start to send audio streams to the network, which are encoded using another audio codec, such as AMR-WB or G.723, although the audio streams encoded in this way cannot be interpreted by the interactive server, and thus place an unnecessarily load on the network.

There is therefore a need for a new technique to define the media streams authorised during the pre-call setup phase.

SUMMARY OF THE INVENTION

The invention proposes a new solution for managing a multimedia session between a calling terminal and at least one called terminal, said multimedia session comprising a pre-call setup phase and a call phase.

According to the invention, such a method comprises, during the pre-call setup phase:
- the reception of an INVITE message generated by a calling terminal, the INVITE message comprising a multimedia session description field containing information relating to a set of media streams, and
- the generation of a response to the INVITE message, the response comprising a header containing at least one media type and at least one first call parameter applicable to at least one media stream of said type, among said set of media streams.

Hence, for a multimedia session, it is possible to define in this header the media type(s) (for example audio, video, text, application, image, etc.) authorised to be exchanged during the pre-call setup phase, and also their direction.

For example, the proposed solution can be used to indicate in the header that we wish to authorise/activate the audio streams in both directions send/receive ("sendrecv"), but without authorising video streams, or even to only authorise one specific codec out of a set of codecs of a given media type.

If we take the context of an IMS network using the SIP signalling protocol, the INVITE message is a message of the type SIP INVITE, the description field type is SDP, and the header type is P-Early-Media.

The proposed solution is based on a modification of the PEM header semantics in order to indicate in the PEM header the type of media stream authorised or not, and also its direction.

It should be remembered that, according to the prior art, the PEM header applies to all the media streams of a given type described in the SDP field. In other words, according to the prior art, it is not possible to select a specific stream from among a set of streams of a same type, for example to authorise or prohibit the delivery of these streams. In addition, the proposed solution has, in particular, the advantage that the PEM header does not depend on the order of the media streams in the SDP description field. Hence, according to the invention, if any entity in the signalling path modifies the SDP description field, it is not necessary to modify the PEM header.

According to a particular embodiment, said header also contains at least one identification parameter to identify a particular media stream among said at least one media stream of said type.

Hence, it is possible to identify, in the header, one or more specific streams within a media type (for example speech, DTMF (Dual-tone Multi-frequency), etc.). It should be remembered in this respect that a "DTMF code" is a combination of frequencies used for conventional fixed telephony (except Voice over IP); the DTMF codes are sent when a button is pressed on the telephone keypad, and are used to dial telephone numbers (unlike the old pulse-dialling telephones, using a rotary dial) and to communicate with interactive voice servers.

For a given media type (audio for example), it is thus possible to identify a specific stream (the telephone-event stream for example) within a given media description, and to authorise this specific stream or not. For example, it is possible to authorise the two-way transmission of audio media DTMF information when the other audio streams remain one-way. In this case, the first call parameter can characterise this specific stream, and can thus apply to a given stream among N streams for a given media type.

For example, such an identification parameter belongs to the group comprising:
a name associated with the media stream, for example the name of its codec: AMR, telephone-event, H263, etc.; and
a number associated with said media stream, for example its RTP (Real-time Transport Protocol) stream number, also called "payload type": 110, 118, 96, etc.

According to a particular embodiment, said header also contains at least one second identification parameter, applicable to the set of media streams.

In other words, the header contains at least one call parameter applicable to the set of media streams, said second call parameter, and at least one call parameter applicable to a media stream type, or to a particular media stream of this media stream type, said first call parameter.

If we take the context of an IMS network using the SIP protocol, we thus retain the present PEM header semantics, with a "global" parameter applying to the totality of the SDP response (second call parameter). The parameter(s) added according to the invention (first call parameter) are used to specify, by media, the differences with respect to the "global" parameter.

Hence, this ensures that a network entity capable of implementing the invention is compatible prior art network entities.

In particular, the first call parameter (and the second call parameter, if provided for in the header) belongs to the group comprising:
"inactive" according to document RFC5009;
"send only" according to document RFC5009;
"recvonly" according to document RFC5009; and
"sendrecv" according to document RFC5009.

The PEM header can thus take the values defined in document RFC 5009 to authorise or not a media stream before call setup and to specify the direction in which these media streams can be established.

In another embodiment, the invention relates to an entity for managing a multimedia session between a calling terminal and at least one called terminal, said multimedia session comprising a pre-call setup phase and a call phase, said entity comprising a reprogrammable calculating machine or a dedicated calculating machine, configured to:

receive an INVITE message generated by a calling terminal, said INVITE message comprising a description field describing said multimedia session and containing information relating to a set of media streams, and generate a response to said INVITE message, said response comprising a header containing at least one media type and at least one first call parameter applicable, during said pre-call setup phase, to at least one media stream of said type, among said set of media streams.

Such an entity is in particular adapted to implementing the method for managing a multimedia session described previously. Hence, such an entity can comprise the different characteristics relating to the method for managing a multimedia session according to the invention, which can be combined or taken separately.

In particular, such an entity is a trusted entity of a communication network, capable or inserting or modifying a PEM header. It can be, for example, an AS application server, a P-CSCF proxy or an S-CSCF server (Proxy/Serving Call Session Control Flow), an IBCF (Interconnect Border Control Function) gateway.

Such an entity can, in particular, comprise physical and/or software means.

The invention also relates to a method for setting up a multimedia session between a calling terminal and at least one called terminal, said multimedia session comprising a pre-call setup phase and a call phase.

Such a method comprises, during said pre-call setup phase:
the generation of an INVITE message comprising a description field describing said multimedia session and containing information relating to a set of media streams.
the reception a response to said INVITE message, and
the selection of at least one media stream to be used during the pre-call setup phase, taking account of a header of said response containing at least one media type and at least one first call parameter applicable to at least one media stream of said type, among said set of media streams.

In this way, a network entity, in particular the calling terminal, can adapt its transmission to the media accepted by the network, right from the pre-call setup phase, by selecting at least one media stream to be used for the session (i.e. for the pre-call setup phase).

The proposed solution thus avoids unnecessarily overloading the network.

In another embodiment, the invention relates to a calling terminal intended to set up a multimedia session with at least one called terminal, said multimedia session comprising a pre-call setup phase and a call phase, said terminal comprising a reprogrammable calculating machine or a dedicated calculating machine, configured to:
generate an INVITE message comprising a description field describing said multimedia session and containing information relating to a set of media streams.
receive a response to said INVITE message, and
select at least one media stream to be used during the pre-call setup phase, taking account of a header of said response containing at least one media type and at least one first call parameter applicable to at least one media stream of said type, among said set of media streams.

Such a calling terminal, is particular, adapted to implementing the method for setting up a multimedia session described previously. Hence, such a terminal can comprise the different characteristics relating to the method for setting up a multimedia session according to the invention, which can be combined or taken separately.

Such a terminal can, in particular, comprise physical and/or software means.

In another embodiment, the invention relates to one or more computer programs containing instructions for the implementation of a method as described above, when this or these programs are executed by a processor.

In yet another embodiment, the invention relates to one or more data media which are nonremovable, or partially or totally removable, computer-readable, and contain the instructions of one or more computer programs for the execution of the steps of at least one method as described above.

The methods according to the invention can therefore be implemented in various ways, notably in wireline form and/or in software form.

LIST OF FIGURES

Other characteristics and advantages of the invention will emerge more clearly upon reading the following description of a particular embodiment, provided as a simple non-restrictive example and referring to the annexed drawings, wherein.

Figure 3:
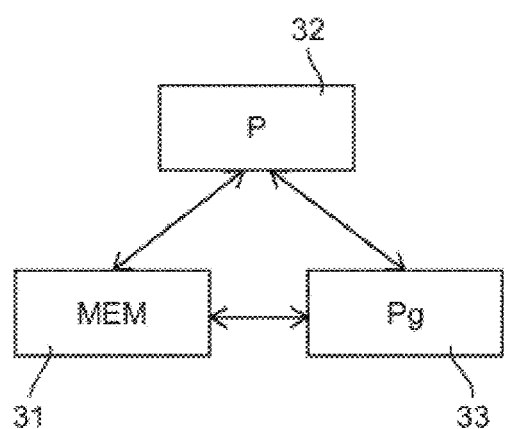
Figure 4:
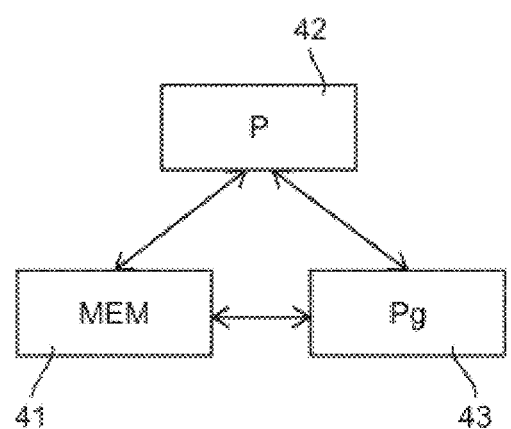

FIGS. 3 and 4 respectively show the simplified structure of a calling terminal and the simplified structure of a communication network entity located between the calling terminal and at least one called terminal.

DESCRIPTION OF AN EMBODIMENT OF THE INVENTION

5.1 General Principle

The general principle of the invention is based on the selection of the media streams authorised during the pre-call setup phase.

To do this, the invention proposes to generate a specific header, to define the granularity necessary to select a particular media stream within a given media type.

Figure 1:
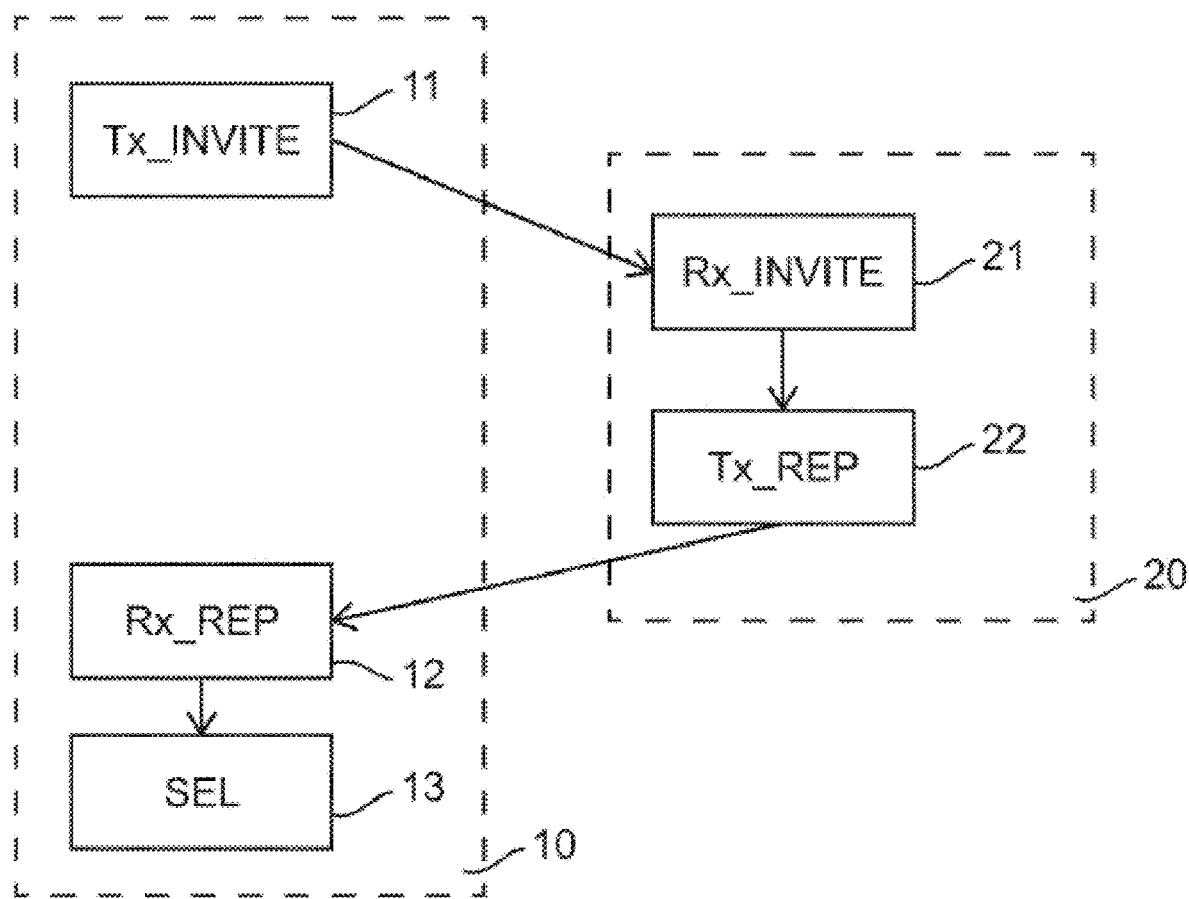
FIG. 1 shows the main steps implemented to set up and manage a multimedia session according to a particular embodiment of the invention.

We now show, in relation to FIG. 1, the main steps implemented to establish and manage a multimedia session between a calling terminal and at least one called terminal. It is considered that such a multimedia session comprises two phases: a pre-call setup phase, during which the media streams are negotiated, and a call phase. The steps described in relation to FIG. 1 are implemented during the pre-call setup phase.

To initiate the multimedia session, the calling terminal 10 generates an INVITE message (Tx_INVITE, 11) containing a description field describing the multimedia session. Such a field contains information relating to a set of media streams.

Such an INVITE message is received by at least one network entity 20 located between the calling terminal and at least one called terminal (Rx_INVITE, 21).

When the INVITE message is received, the network entity 20 generates a response to the INVITE message (Tx_REP, 22). Such a response comprises a header containing at least one media type and at least one first call parameter applicable to at least one media stream of said type, among the set of media streams.

The calling terminal 10 receives the response to the INVITE message from the network entity 20 (Rx_REP, 12) selects at least one media stream to be used for the pre-call setup phase, taking account of the header of said response (SEL, 13). The calling terminal 10 thus analyses the header of the response received in order to be able to adapt its media stream transmission to the specifications imposed by the header.

5.2 Description of a Particular Embodiment

We describe in more detail below an example of an implementation of the invention for the delivery of "early media" streams in IMS networks. In this context, the INVITE message is of the SIP INVITE message type, the description field is of the SDP type, and the header is of the P-Early-Media or PEM type.

Figure 2:
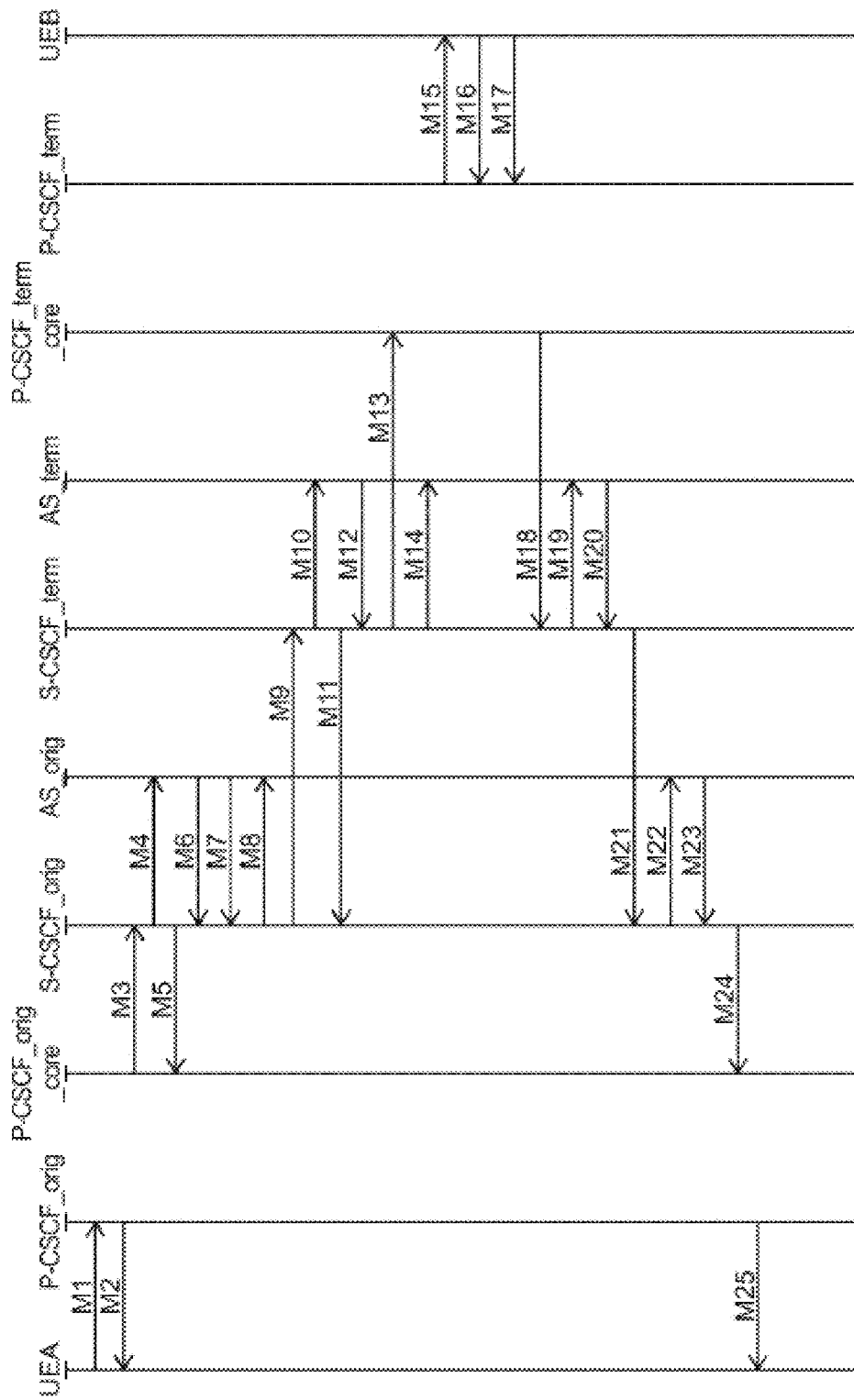
FIG. 2 shows a timing diagram illustrating the messages exchanged between the different entities of a communication network in order to set up a call.

To illustrate the invention, we now show, in relation to FIG. 2, a timing diagram illustrating the establishment and the management of a videoconference session between a calling terminal and at least one called terminal, and more specifically the messages exchanged during a pre-call setup phase.

The calling terminal UEA generates an INVITE message M1 contains a multimedia session description field: M1=INVITE SDP( . . . ).

For example, the description field contains a description of a set of audio streams (m=audio) and video streams (m=video) and, in particular, information relating to the codec(s) accepted by the calling terminal UEA, and also the IP address and port number on which it wishes to receive the media stream(s).

An example of an SDP field is given below:
v=0
o='6306151 6306151 IN IP4 BC00.QZ27.ORANGE-MSS.FR
s=-
c=IN IP4 172.20.1.101
t=0 0
a=sendrecv
m=audio 10464 RTP/AVP 118 110
b=RR:1087
b=RS:362
a=rtpmap:118 AMR/8000/1
a=fmtp:118 mode-set=0,2,4,7;mode-change-period=2; mode-change-capability=2;mode-change-neighbor=1;max-red=0
a=rtpmap:110 telephone-event/8000
a=fmtp:110 0-15
a=ptime:20
a=maxptime:40
m=video 32510 RTP/AVP 96
a=recvonly
a=rtpmap:96 H263-2000/90000
a=framesize:96 176-144
a=framerate:8
a=fmtp:96 profile=0; level=45

Such an INVITE message M1 is received by proxy P-CSCF of the calling terminal's IMS network, written P-CSCF_orig. Proxy P-CSCF_orig confirms to the calling terminal UEA the reception of the INVITE message by a message M2: M2=100_Trying.

Proxy P-CSCF_orig also has a network interface allowing it to exchange with the core network, written P-CSCF_orig_core.

The P-CSCF_orig_core network interface formats the INVITE message and sends it to server S-CSCF of the calling terminal's IMS network, written S-CSCF_orig: M3=INVITE SDP( . . . ). Server S-CSCF_orig is notably responsible for initiating the services from the caller to the respective applications servers, services such as OIR (Originating Identification Restriction) relating to an anonymous call, or Call Barring relating to a restricted service.

Server S-CSCF_orig sends the INVITE message to the calling terminal's IMS network application server, written AS_orig: M4=INVITE SDP( . . . ).

Server S-CSCF_orig confirms to the P-CSCF_orig_core network interface the reception of the INVITE message by a message M5: M5=100_Trying.

Server AS_orig confirms to server S-CSCF_orig the reception of the INVITE message by a message M6: M6=100_Trying.

Server AS_orig verifies the services to which the calling terminal user UEA has subscribed, modifies the request if necessary so that it conforms to the subscribed services and sends back to server S-CSCF_orig the INVITE message: M7=INVITE SDP( . . . ).

Server S-CSCF_orig confirms to server AS_orig the reception of the INVITE message by a message M8: M8=100_Trying.

Server S-CSCF_orig then contacts server I/S-CSCF of the called terminal's IMS network, written S-CSCF_term (and, in this example, co-located with the I-CSCF (Interrogating-CSCF)), and sends it the INVITE message: M9=INVITE SDP( . . . ).

Server S-CSCF_term sends the INVITE message to the called terminal's IMS network application server, written AS_term: M10=INVITE SDP( . . . ).

Server S-CSCF_term confirms to server S-CSCF_orig the reception of the INVITE message by a message M11: M11=100_Trying.

When message M10 is received, server AS_term verifies the services to which the called terminal user UEB has subscribed, modifies the request if necessary so that it conforms to the subscribed services and sends back to server S-CSCF_term the INVITE message: M12=INVITE SDP( . . . ).

Server S-CSCF_term sends to the network interface of the called terminal IMS network's proxy P-CSCF, written P-CSCF_term_core, the INVITE message: M13=INVITE SDP( . . . ).

Server S-CSCF_term also confirms to the server AS_term the reception of the INVITE message by a message M14: M14=100_Trying.

Proxy P-CSCF of the called terminal's IMS network, written P-CSCF_term, sends to the called terminal UEB the INVITE message: M15=INVITE SDP( . . . ).

The called terminal UEB confirms to proxy P-CSCF_term the reception of the INVITE message by a message M16: M16=100_Trying.

The called terminal UEB also generates a response message containing information on the session's progress: M17=183 Session Progress SDP( . . . ).

This response message is received by proxy P-CSCF_term.

The P-CSCF_term_core network interface formats the response message and sends it to server S-CSCF_term: M18=183 Session Progress SDP( . . . ).

Server S-CSCF_term sends the response message to server AS_term: M19=183 Session Progress SDP( . . . ).

When message M19 is received, server AS_term verifies the services to which the called terminal user UEB has subscribed, modifies the response if necessary so that it conforms to the subscribed services and sends back to server S-CSCF_term the response message: M20=183 Session Progress SDP( . . . ).

Server S-CSCF_term sends the response message to server S-CSCF_orig of the calling terminal's IMS network: M21=183 Session Progress SDP( . . . ).

Server S-CSCF_orig sends the response message to application server AS_orig: M22=183 Session Progress SDP( . . . ).

Server AS_orig verifies the services to which the calling terminal user UEA has subscribed, modifies the request if necessary so that it conforms to the subscribed services and sends back to server S-CSCF_orig the response message: M23=183 Session Progress SDP( . . . ).

Server S-CSCF_orig sends to the network interface of proxy P-CSCF_orig_core the response message: M24=183 Session Progress SDP( . . . ).

Proxy P-CSCF_orig sends to the calling terminal the response message: M25=183 Session Progress SDP( . . . ).

It should be noted that if the calling terminal UEA and the called terminal UEB belong to networks managed by different operators, then there is an additional entity, an IBCF gateway, between servers S-CSCF_orig and S-CSCF_term.

According to the example shown in FIG. 2, the P-Early-Media header can be inserted in a "183 Session Progress" response message. Indeed, such a response message is traditionally used to communicate session progress information. An explanatory text, the header fields and the body of the message can be used to provide this information.

In the example described above, the SDP field describes two two-way audio streams and one two-way video stream (a=sendrecv):
- m=audio 10464 RTP/AVP 118 110 corresponds to the description of the two audio streams, received on port 10464, according to the RTP/AVP protocol, with the RTP stream number of the first audio stream equal to 118 and the RTP stream number of the second audio stream equal to 110;
- m=video 32510 RTP/AVP 96 corresponds to the description of the video stream, received on port 32510, according to the RTP/AVP protocol, with the RTP stream number of the video stream equal to 96.

If nothing is specified during the call setup phase, the calling terminal can start to send audio and/or video early media streams according to the different codecs defined in the SDP field, whatever the capabilities of the other network entities. An interactive voice server can therefore receive video streams that it is unable to interpret.

According to the invention, the P-Early-Media header is thus modified to specify at least one media type and at least one first call parameter applicable to at least one media stream of said type, among said set of media streams.

A description is given below of three examples of syntax for the modified PEM header according to the invention, used to specify that only the audio streams are authorised for two-way calls (transmission/reception) during the call setup phase, and video streams are prohibited.

According to a first example, the modified PEM header according to the invention can have the following syntax:
P-Early-Media: video=inactive We thus specify a media type (video), and a "first" "specific" call parameter, applicable to the media streams of this type (inactive), among all media streams.

As a variant, it is possible to specify a "second" "global" call parameter, applicable to all media streams.

Thus, according to a second example, the modified PEM header according to the invention can have the following syntax:

P-Early-Media: sendrecv;video=inactive

We thus specify a "second" call parameter applicable to all media streams (sendrecv, which means that all transmission and reception streams are authorised), then a media type (video), and a "first" call parameter applicable to the media streams of this type (inactive), which specifies, by media, a difference with respect to the "global" parameter (i.e. that no video transmission or reception stream is authorised).

In an equivalent manner, according to a third example, the modified PEM header according to the invention can have the following syntax:

P-Early-Media: inactive;audio=sendrecv

We thus specify a "second" call parameter applicable to the set of media streams (inactive, which means that no transmission or reception stream is authorised), then a media type (audio), and a "first" call parameter" applicable to the media streams of this type (sendrecv), which specifies, by media, a difference with respect to the "global" parameter (i.e. that all audio transmission or reception streams are authorised).

It is also possible to add an identification parameter to the PEM header to identify a particular media stream for a given media type.

This thus provides an additional level of refinement to define a stream's call parameters.

For example, we can identify a particular stream, among a set of media streams of a same type, by its RTP stream number, also called "Payload Type".

Hence, in the previous example, for audio media, if we wish to indicate that only the audio stream relating to the DTMF telephone-events is authorised in two-way mode, whereas the other audio streams are only authorised for delivery (i.e. transmission direction only), the modified PEM header according to the invention can have the following syntax:

P-Early-Media:audio=(110,sendrecv);video=inactive

We thus specify a first media type, audio media, and a "first" audio call parameter ("sendrecv") applicable to an audio media stream identified by an identification parameter (RTP stream number: 110), and a second media type, video media, and a "first" video call parameter ("inactive") applicable to all video media streams.

The modified PEM header according to the invention can also have the following syntax:

P-Early-Media: sendonly;audio=(110,sendrecv);video=inactive

We thus indicate that all the media streams are authorised for transmission only ("second" call parameter equal to "sendonly"), with the exception of the video stream which is not authorised ("first" video call parameter set to "inactive") and telephone events (RTP stream number 110 is associated with the telephone events: "telephone-event, payload 110") which are two-way ("sendrecv"), for example to be able to make choice selections via DTMFs with an interactive server.

As a variant, rather than use the RTP stream number to identify a particular stream, its name or any other identifier can be used. For example, the modified PEM header according to the invention can have the following syntax:

P-Early-Media: audio=(AMR,sendonly) or even:
P-Early-Media: inactive;audio=(AMR,sendonly)

We thus indicate that no media stream is authorised, with the exception of the one-way AMR audio stream.

5.3 Variants

According to the example shown in FIG. 2, the P-Early-Media header can be inserted in a "183 Session Progress" response message. This is of course a simple example.

As indicated in table 1 of document RFC 5009, the PEM header can, as a variant, be inserted in the SIP "INVITE" requests (session setup), "PRACK" (provisional acknowledgement) or "UPDATE" (modification of the state of a session), in the "INVITE" 18× response messages, or in the "PRACK" or "UPDATE" 2×× response messages.

In particular, the PEM header can be inserted or modified by proxies P-CSCF_orig or P-CSCF_term, by application servers AS_orig or AS_term, by servers S-CSCF_orig or S-CSCF_term, or even by the IBCF gateway for a call to a third-party network. Indeed, these different entities are considered to be trusted entities for the multimedia session.

More generally, the PEM entity can be inserted or modified by any of the network's trusted entities.

Furthermore, the invention is not limited to the IMS networks and to the SIP signalling protocol. It can be used for any communication session involving the negotiation of a set of media streams during a pre-call setup phase, for the exchange of "early media" streams.

5.4 Structures

We finally show, in relation to FIGS. 3 and 4, the simplified structures of a calling terminal and of a network entity located between the calling terminal and at least one called terminal according to one of the embodiments described above.

As shown in FIG. 3, such a calling terminal comprises a memory 31 comprising a buffer memory, a processing unit 32, equipped for example with a reprogrammable calculating machine or a dedicated calculating machine, for example a processor P, and controlled by the computer program 33, implementing the multimedia session setup method according to an embodiment of the invention.

At initialisation, the code instructions of the computer program 33 are, for example, loaded into a RAM memory before being executed by the processor of the processing unit 32.

The processor of the processing unit 32 implements the steps of the multimedia session setup method described previously, according to the instructions of the computer program 33, in order to select at least one media stream to be used for the session, from a specific header as described previously.

As shown in FIG. 4, a network entity located between the calling terminal and at least one called terminal comprises a memory 41 comprising a buffer memory, a processing unit 42, equipped for example with a reprogrammable calculating machine or a dedicated calculating machine, for example a processor P, and controlled by the computer program 43, implementing the multimedia session setup method according to an embodiment of the invention.

At initialisation, the code instructions of the computer program 43 are, for example, loaded into a RAM memory before being executed by the processor of the processing unit 42. The processing unit 42 receives as input an INVITE message, and generates a response containing a specific header.

The processor of the processing unit 42 implements the steps of the multimedia session setup method described previously, according to the instructions of the computer program 43, in order to insert/modify the header and thus control the media streams authorised during the call setup phase.

The invention claimed is:

1. A method of managing a multimedia session between a calling terminal and at least one called terminal, the multimedia session comprising a pre-call setup phase and a call phase, the method being implemented by a network entity and comprising, during the pre-call setup phase:
   a reception of an INVITE message generated by the calling
terminal, wherein the INVITE message comprises a description field describing the multimedia session and containing information relating to a set of media streams; and
   a generation of a response to the INVITE message,
wherein the response comprises a header containing at least one media type and at least one first call parameter applicable to at least one media stream with the at least one media type, among the set of media streams.

2. The method of claim 1, wherein the header also contains at least one identification parameter for identifying a particular media stream among the at least one media stream with the at least one media type.

3. The method of claim 2, wherein the at least one identification parameter belongs to a group of identification parameters comprising:
   a name associated with the particular media stream; and
   a number associated with the particular media stream.

4. The method of claim 1, wherein the header also contains at least one second call parameter, applicable to the set of media streams.

5. The method of claim 1, wherein the first call parameter belongs to a group of call parameters comprising:
   an inactive call parameter;
   a send-only call parameter;
   a receive-only call parameter; and
   a send-receive call parameter.

6. The method of claim 1, wherein the header is a P-Early-Media type according to SIP protocol.

7. A computer comprising a processor and a memory, the memory having stored thereon instructions which, when executed by the processor, cause the computer to implement the method of claim 1.

8. A non-transitory computer readable medium which is either a non-removable, partially removable, or totally removable medium, and having stored thereon instructions which, when executed by a processor, cause the processor to implement the method of claim 1.

9. A method for setting up a multimedia session between a calling terminal and at least one called terminal, the multimedia session comprising a pre-call setup phase and a call phase, the method being implemented by a calling terminal and comprising, during the pre-call setup phase:
   generation of an INVITE message comprising a description field describing the multimedia session and containing information relating to a set of media streams; and
   a reception of a response to the INVITE message,
wherein the method also involves a selection of at least one media stream to be used during the pre-call setup phase, taking account of a header of the response containing at least one media type and at least one first call parameter applicable to at least one media stream with the at least one media type, among the set of media streams.

10. An entity for managing a multimedia session between a calling terminal and at least one called terminal, the multimedia session comprising a pre-call setup phase and a call phase, the entity comprising a processor of a reprogrammable calculating machine or a dedicated calculating machine, the processor configured to:
   receive an INVITE message generated by the calling terminal, wherein the INVITE message comprises a description field describing the multimedia session and containing information relating to a set of media streams; and
   generate a response to the INVITE message,
wherein the response comprises a header containing at least one media type and at least one first call parameter applicable, during the pre-call setup phase, to at least one media stream with the at least one media type, among the set of media streams.

11. A calling terminal intended to set up a multimedia session with at least one called terminal, the multimedia session comprising a pre-call setup phase and a call phase, the calling terminal comprising a processor of a reprogrammable calculating machine or a dedicated calculating machine, the processor configured to:
   generate an INVITE message comprising a description field describing the multimedia session and containing information relating to a set of media streams; and
   receive a response to the INVITE message, wherein
the reprogrammable calculating machine or the dedicated calculating machine is also configured to select at least one media stream to be used during the pre-call setup phase, taking account of a header of the response containing at least one media type and at least one first call parameter applicable to at least one media stream with the at least one media type, among the set of media streams.

* * * * *

UNITED STATES PATENT AND TRADEMARK OFFICE
CERTIFICATE OF CORRECTION

| | |
|---|---|
| PATENT NO. | : 11,277,451 B2 |
| APPLICATION NO. | : 16/759284 |
| DATED | : March 15, 2022 |
| INVENTOR(S) | : José Doree et al. |

It is certified that error appears in the above-identified patent and that said Letters Patent is hereby corrected as shown below:

In the Specification

In Column 6, Line 35, delete "o = '6306151" and insert --o = -6306151--.

In Column 9, Line 64, delete "or even:" and insert the same at Line 65 as a new paragraph.

Signed and Sealed this
Fourteenth Day of June, 2022

Katherine Kelly Vidal
*Director of the United States Patent and Trademark Office*